United States Patent
Siegel

(10) Patent No.: US 6,322,163 B1
(45) Date of Patent: Nov. 27, 2001

(54) HYDRAULIC VEHICLE BRAKE SYSTEM WITH ANTILOCK DEVICE

(75) Inventor: Heinz Siegel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/194,439

(22) PCT Filed: Jan. 9, 1998

(86) PCT No.: PCT/DE98/00051

§ 371 Date: Nov. 25, 1998

§ 102(e) Date: Nov. 25, 1998

(87) PCT Pub. No.: WO98/42554

PCT Pub. Date: Oct. 1, 1998

(30) Foreign Application Priority Data

Mar. 26, 1997 (DE) .............................................. 197 12 732

(51) Int. Cl.[7] ..................................................... B60T 8/42
(52) U.S. Cl. .................................... 303/115.4; 303/116.1; 303/119.1
(58) Field of Search ............................. 303/115.1, 116.1, 303/119.1, 113.2, 115.4, 113.5, 10, 3

(56) References Cited

U.S. PATENT DOCUMENTS

| | | | |
|---|---|---|---|
| 5,531,509 | * 7/1996 | Kellner et al. | 303/114.1 |
| 5,586,814 | * 12/1996 | Steiner | 303/116.2 |
| 5,727,852 | * 3/1998 | Pueschel et al. | 303/155 |
| 5,927,824 | * 7/1999 | Pahl et al. | 303/113.2 |
| 5,988,774 | * 11/1999 | Jonner et al. | 303/113.5 |

FOREIGN PATENT DOCUMENTS

WO 97/04998 * 2/1997 (DE).
06-211120 * 8/1994 (JP).

* cited by examiner

*Primary Examiner*—Matthew C. Graham
*Assistant Examiner*—Mariano Sy
(74) *Attorney, Agent, or Firm*—Ronald E. Greigg

(57) ABSTRACT

An inexpensive hydraulic brake system for a vehicle including an antilock device, by means of which brake pressures in front wheel brakes and rear wheel brakes of a four-wheeled vehicle that are connected to diagonal brake circuits can be changed to a large extent independently of one another in order to reduce or eliminate the danger of wheel locking. The antilock device should have one return feed pump per brake circuit. The brake system is equipped with the antilock device with a total of six electrically controllable valves. In each of the brake circuits a first valve is disposed between the master cylinder and a front wheel brake and a second valve is disposed between the master cylinder and the rear wheel brake and a third valve is disposed between the front wheel brake and an inlet of each of the return feed pumps. The inlets of the return feed pumps are respectively connected indirectly to the rear wheel brakes by means of check valves, which can be opened in the direction of the inlets of the return feed pumps. The antilock device is inexpensively constructed and in antilock operation, for example on an icy road surface, rear wheel brake pressures can be higher than front wheel brake pressures in order to improve the braking action.

11 Claims, 3 Drawing Sheets

HYDRAULIC VEHICLE BRAKE SYSTEM WITH ANTILOCK DEVICE

PRIOR ART

The invention relates to a hydraulic vehicle brake system with an antilock device.

The reference DE 4 422 518 A1 has disclosed a hydraulic vehicle brake system that constitutes the generic type, with a dual-circuit master cylinder, with two brake circuits in diagonal division for two front wheel brakes and two rear wheel brakes, and with an antilock device incorporated into the brake circuits, and for each brake circuit, this antilock device has a return feed pump with an inlet and an outlet, and has a first and a second electrically controllable valve, wherein the valves are embodied as normally open valves, wherein the first valve is disposed between the master cylinder and the respective front wheel brake and wherein the respective second valve is connected to the respective rear wheel brake. The respective second valve normally connects the rear wheel brake of a brake circuit to the front wheel brake of the same brake circuit. In antilock operation, this has the disadvantage that a brake pressure in the rear wheel brake cannot increase higher than a permissible brake pressure in the front wheel brake. If one desired to increase the brake pressure in the rear wheel brake above a permissible front wheel brake pressure, then the front wheel would have to be excessively braked for a short time, with the result of possibly impermissible brake slip, loss of steerability, and excessive tire wear. The desire for a higher brake pressure in the rear wheel brake in comparison to the brake pressure in a front wheel brake is brought about, for example, by virtue of the fact that with the release of the gas pedal, a drive motor of the vehicle, which motor is associated with the front wheels, acts in a braking manner on the front wheels, which on snow and ice can rapidly lead to a front wheel locking danger as soon as the brake pedal is actuated. Another reason for the desire for a higher brake pressure in a rear wheel brake relative to the brake pressure in a front wheel brake is that on a low-traction road surface with correspondingly low potential vehicle deceleration, the rear wheels can provide a relatively higher contribution to the vehicle deceleration than is possible on a high-traction road surface.

ADVANTAGES OF THE INVENTION

The hydraulic vehicle brake system according to the invention has the advantage that in antilock operation, at least on a low-traction road surface, a rear wheel brake pressure can at least temporarily be higher than a front wheel brake pressure and that depending on conditions, the brake pressure of the front wheel brake can even be temporarily increased and thereby can be set higher than the current rear wheel brake pressure, which where possible must be reduced at the same time as the increase in the brake pressure of the front wheel brake. The hydraulic vehicle brake system according to the invention thus provides the possibility of changing a front wheel brake pressure and a rear wheel brake pressure in opposite directions. Additionally, during a normal braking operation, it is possible to stop brake pressure increases in the rear wheel brakes by closing the second valves when a slip limit associated with the rear wheels is reached and to thus assure that when braking on a uniformly very high-traction road surface, the front wheels tend to lock before the rear wheels. Excessive locking danger would then trigger the antilock operation. The installation of rear wheel brake pressure control valves or rear wheel brake pressure limiting valves that function in a deceleration-dependent or rear axle load-dependent manner can therefore be avoided.

Advantageous improvements and updates of the hydraulic vehicle brake system disclosed are possible by means of the measures set forth herein.

The vehicle brake syatem has the advantage that inexpensive 2/2-way valves can be used, wherein 2/2-way valves from the prior art can be used.

The vehicle brake system has the advantage that inexpensive 2/2-way valves of a prior type and size can be used and that a flow resistance required to determine brake pressure increase speeds in at least one of the wheel brakes can be realized by means of the throttle according to the claim.

The vehicle brake system has the advantage that brake pressure change speeds can be adjusted by means of an electromagnet of the valve disposed between the master cylinder and the respective wheel brake and if need be, can be changed during an antilock operation. The excitation current of the electromagnet can be adjusted or regulated for this purpose.

The hydraulic vehicle brake system makes it possible to set the feed output of these return feed pumps lower, particularly when using constant valves, which also include differential pressure regulating valves, after a first large brake pressure reduction by means of greater feed output of the return feed pumps when, as the antilock operation continues, only slight or slow brake pressure changes are required. This has the advantage of lower energy consumption and lower noise generation.

The hydraulic vehicle brake system has the advantage that front wheel brake pressures and rear wheel brake pressures decrease rapidly when the brake pedal is released.

The improvement produces the advantage that with the further use of return feed pumps which are used to protect against wheel locking when braking by means of actuating the brake pedal, additional drive slip regulation by means of compensation of excess driving torque in drivable front wheels is possible by means of automatic braking.

The characterizing features disclose a structurally simple embodiment feature for this. The characterizing features counteract an undesirable brake pressure reduction in the rear wheel brake cylinders during a drive slip regulating operation, on the condition that the second valve connected in parallel to the check valve is closed by means of electrical control.

The characterizing features disclose a second exemplary embodiment furnished for drive slip regulating operation, which only needs four electrically controllable valves per brake circuit.

The characterizing features disclose a concrete embodiment example, which can be inferred from the reference WO 94/08831.

BRIEF DESCRIPTION OF THE DRAWINGS

Three exemplary embodiments of the vehicle brake system according to the invention are shown in the drawings and will be explained in more detail below.

DESCRIPTION OF THE EXEMPLARY EMBODIMENTS

Figure 1:
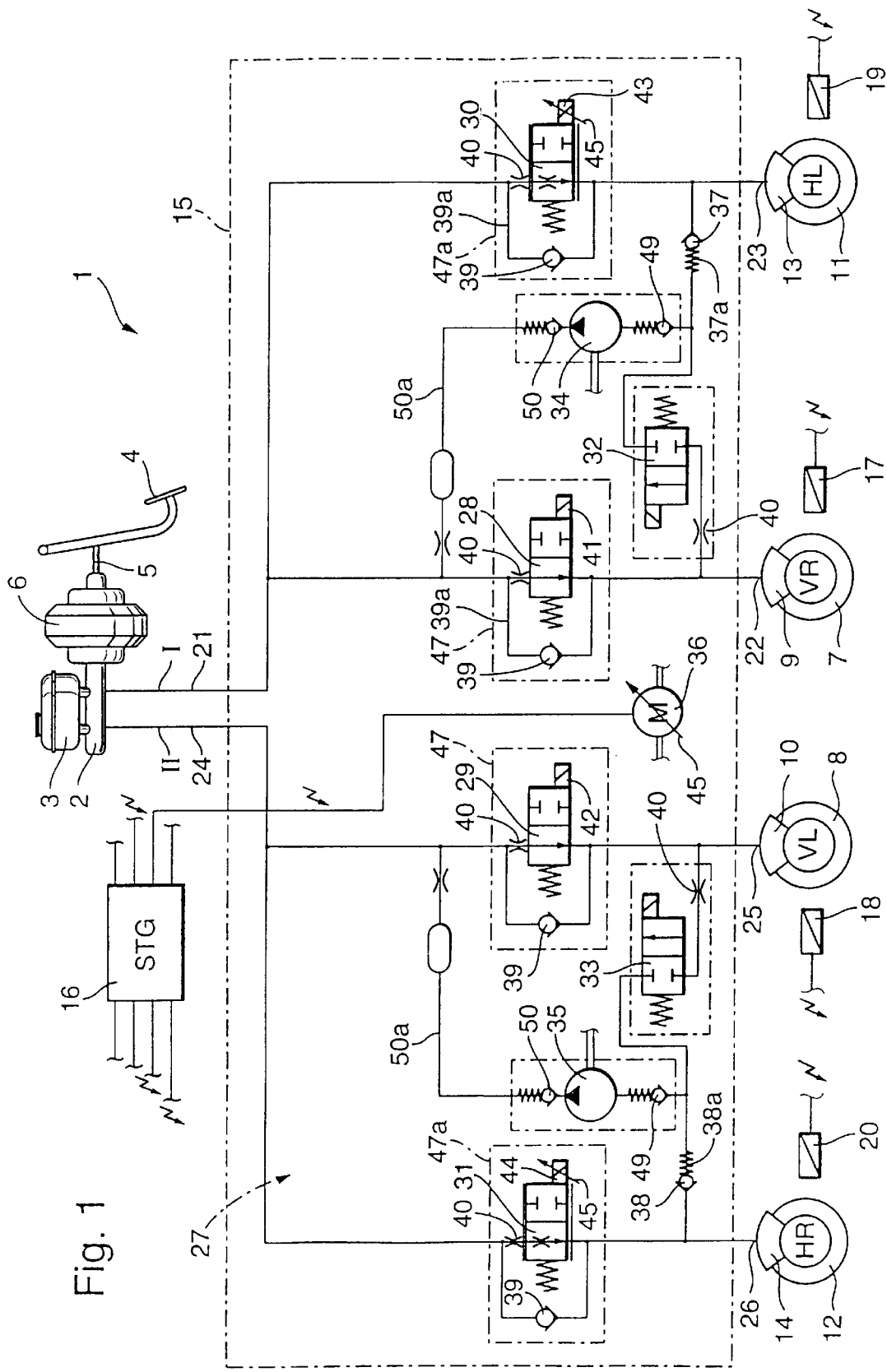
FIG. 1 shows a first circuit for the vehicle brake system, which is furnished for reducing the danger of wheel locking when braking.

The hydraulic vehicle brake system according to the circuit diagram of FIG. 1 has a dual-circuit master cylinder 2 with a reservoir 3, a brake pedal 4, a pedal rod 5, a brake booster 6, two brake circuits I and II, two front wheel brakes 7, 8 with wheel brake cylinders 9, 10, two rear wheel brakes 11, 12 with wheel brake cylinders 13, 14, an antilock device 15 and a control device 16 belonging to the antilock device 15, as well as wheel rotation sensors 17, 18, 19, and 20 to which the control device 16 is connected in a manner that is known in and of itself.

The brake circuit I includes a main brake line 21 leading from the master cylinder 2 to the antilock device 15, as well as wheel brake lines 22 and 23 that lead from the antilock device 15 and end at the wheel brake cylinders 9 and 13. In a similar manner, the brake circuit II includes a main brake line 24 and two wheel brake lines 25 and 26, wherein the wheel brake line 25 leads to the wheel brake cylinder 10 and the wheel brake line 26 leads to the wheel brake cylinder 14.

The antilock device 15 has a valve block 27 into which first valves 28 and 29, second valves 30 and 31, and third valves 32 and 33, two return feed pumps 34, 35 that have a common drive motor 36, and two check valves 37, 38 are incorporated. Alternatively, other check valves 39 and throttles 40 can also be inserted.

The first valves 28 and 29 are embodied as 2/2-way valves that can be controlled by means of electromagnets 41 and 42 and are open when the electromagnets 41 and 42 are without current. The second valves 30 and 31 can be controlled by means of other electromagnets 43 and 44 and in this instance, are likewise embodied as 2/2-way valves that are open when the electromagnets 43 and 44 are without current. As is indicated with parallel lines at the 2/2-way valves 30 and 31, a modification is possible to a so-called constant valve, whose opening cross section can be constantly adjusted. For this, the electromagnets 43 and 44 are associated with variable arrows 45, which symbolize an adjustability of the current intensity, which results in the smooth adjustment. The first valves 28, 29 are incorporated into the two brake circuits I and II between the main brake lines 21 and 24 leading from the master cylinder 2 and the wheel brake lines 22, 25 leading to the wheel brake cylinders 9, 13. In connection with bypass lines 39a, the check valves 39 constitute bypasses around the first valves 28 and 29, wherein the check valves 39 can be opened in relation to the main brake lines 21 and 24 and consequently to the master cylinder 2. The check valves 39 can, for example, be embodied in the form of known collar check valves and can be combined with the valves 28 and 29 into standard components 47, as is symbolically depicted by dot-and-dash borders. For example, known spring-less check valves or the like can also be inserted. The throttles 40 are connected in series with he first valves 28 and 29 and are likewise incorporated into the standard components 47. The throttles 40 are used in a manner that is known per se and, in adapting to a vehicle to be equipped with them, are used for technical regulating reasons to limit increase speeds of wheel brake pressures in wheel lock preventing operation.

The second valves 30, 31 are inserted between the main brake lines 21, 24 and the wheel brake lines 23 and 26. Alternatively, check valves 39 with bypass lines 39a are again disposed as bypasses that can be opened in the direction of the master cylinder 2. The second valves 30, 31 can in turn be connected in series with throttles 40. Here, too, the valves, the check valves, and the throttles can be combined into standard components 47a.

The third valves 32, 33 are embodied here as electrically controllable 2/2-way valves in such a way that they are closed when they are without electrical current and are inserted between the wheel brake line 22 and an inlet valve 49 of the return feed pump 34 or between the wheel brake line 25 and the inlet valve 49 of the return feed pump 35. The check valve 37 is inserted between the wheel brake line 23 and the above-mentioned inlet valve 49 of the return feed pump 34. The check valve 37 can be opened in the direction of the return feed pump 34 and for example, is loaded as shown by means of a prestressed spring 37a. In the same manner, the check valve 38 is inserted between the wheel brake line 26 and the return feed pump 35 and can likewise have a spring 38a in a stressed state. The return feed pumps 34, 35 also have outlet valves 50 from which pressure lines 50a lead in feed directions to the main brake lines 21, 24. Damping chambers and damping throttles, not shown, can be inserted in a manner that is known per se. In a series connection to the third valves 32, 33, throttles 40 can likewise be provided, which one skilled in the art adapts to technical regulating requirements, which have already been mentioned above. The drive motor 36 in this instance is likewise provided with a variable arrow 45, which characterizes an adjustability of speed.

In accordance with the variable arrows 45, the control device 16 is furnished in order to supply valve control currents or motor control current of different intensity or to supply different voltages for the drive motor. For example, in a manner that belongs to the prior art, the intensity of the respectively desired current can be adjusted by means of so-called pulse width modulation, starting with a constant d.c. voltage. On the other hand, the valves 28, 29, 32, and 33, on whose electromagnets no variable arrows are to be found, can be completely opened and completely closed synchronously in rapid succession in the older, known manner, in order to attain effective volume flows that turn out to be average values of opening times and closing times of the valves. Therefore one skilled in the art has a wide selection potential with regard to the choice of the valves or valve types and their electrical actuation.

Operation of the Vehicle Brake System

When the brake pedal 4 is actuated, the positions of the first, second, and third valves 28, 29, 30, 31, 32, and 33 shown in FIG. 1 result in the fact that depending on the intensity of the actuation of the brake pedal 4 a force is introduced by way of the pedal rod 5 into the brake booster 6 so that through the action of this force and the boosting force of the brake booster 6, a pressure is generated in the master cylinder 2, which is transmitted by means of the main brake lines 21 and 24, the throttles 40, and finally the open first and second valves 28, 29, 30, and 31 into the wheel brake cylinders 9, 10, 13, and 14 and activates the wheel brakes 7, 8, 11, 12 and acts indirectly on vehicle wheels, not shown, in a rotation-decelerating manner. If a driver chooses a force on the brake pedal 4 of such a magnitude that only an insignificant brake slip occurs in the vehicle wheels, then the first, second, and third valves remain in the normal positions.

If, for example, the driver actuates the brake pedal in a panicky manner due to the situation, then by way of the brake pedal 4, with the aid of the brake booster 6, he generates a pressure in the master cylinder 2 that is intrinsically too high at a coefficient of friction currently present between the vehicle wheels and a road surface, which produces a disadvantageous increase of brake slip. The control device 16 is connected to the wheel rotation sensors 17 to 20 and receives signal sequences from them, which directly depend on the rotations of the vehicle wheels. The control device 16 observes in what way sequences of these signals from the wheel rotation sensors change, i.e. the control device observes in what way time intervals between the wheel rotation signals become longer. Consequently, the control device 16 observes the wheel rotation behavior and when the wheel rotation behavior indicates an impermissibly increasing wheel slip, or when disadvantageous wheel brake slip has occurred, then drive motor 36 for driving the return feed pumps 34 and 35 is switched on, and when wheel brake slip in front wheels and rear wheels has increased disadvantageously, then the first and second valves 28, 29, 30, and 31 switch into closed positions and the third valves 32 and 33 switch into their open positions. This results in the fact that pressure fluid from the wheel brake cylinders 9, 10, 13, and 14 travels through the inlets 49 into the return feed pumps 34, 35 and is forced by the return feed pumps through outlet valves 50, the pressure lines 50a, and the main brake lines 21, 24 into the master cylinder with the result that brake pressures in the wheel brake cylinders 9, 10, 13, 14 are reduced in the desired manner and wheel slips in wheels of the vehicle diminish in magnitude. If, for example, the brake slip in a front wheel is then sufficiently reduced, then the control device 16 permits the associated third valve, for example one of the valves 32, 33, to return to the normal position shown, with the result that initially, the brake pressure remains constant in the at least one wheel brake cylinder 9 or 10 of front wheel brakes 7, 8. During this, brake pressure for at least one of the wheel brake cylinders 13, 14 of the rear wheel brakes 11 and 12 can be adjusted by means of a variable current supply respectively to at least one of the two electromagnets 43, 44 so that at least one of the second valves 30 and 31 functions as an adjustable orifice, which, as already indicated, is represented by parallel lines on the symbols of the second valves. In other words, the second valves 30 and 31 in the example are proportional directional valves. It is clear that after the opening of at least one of the check valves 37 and 38, the driven return feed pumps 34 and 35 supply pressure fluid quantities that on the one hand, come from the respective wheel brake cylinders 13 and 14 and on the other hand, can flow to the inlets 49 of the pumps 34 and 35 by means of at least one of the second valves 30 or 31 and the throttles 40 disposed upstream of them. In this respect, it is possible to smoothly vary wheel brake pressures in rear wheel brake cylinders 13 and 14 and therefore to smoothly vary brake forces provided that no wheel brake pressure change is needed for the front wheel brake 7 or 8 disposed in the same brake circuit. Depending on the conditions, it is possible to reduce the brake forces of the front and rear wheel brake simultaneously and to thus reduce brake forces on the whole and, after the adjustment of front wheel brake pressure, to increase rear wheel brake pressure in accordance with a loading of the rear wheels that has increased in a relative manner due to lower vehicle deceleration and in accordance with a possibility for increasing the brake force share of the rear wheels in the vehicle deceleration. If a vehicle that is braked in the manner described travels, for example, onto a section of road surface that has increased traction, then with the set wheel brake pressures, the respective wheel brake slip decreases, which is detected by the control device 16. The control device then increases wheel brake pressure for the front wheel brakes, for example by means of a single or multiple short opening of the respective first valve 28 or 29. If the control device 16 determines that wheel brake pressures for the rear wheel brakes 11 and 12 may also be increased, then the control device at least reduces its throttling action by means of changing the impingement of current on the electromagnets 43 and 44, which then leads to brake pressure increases in the wheel brake cylinders 13 and 14.

When the wheel brake pressure of the wheel brake cylinders 13 and 14 decreases, fluid flow passes through check valves 37 and 38. These check valves are loaded by means of springs 37a and are therefore closed in their normal positions, which are shown. For example, this produces the possibility to maintain a rear wheel brake pressure, which has been set low, by means of closing at least one of the two second valves 30, 31 when the front wheel brake pressure, by means of opening at least one of the two third valves 32, 33 upstream of the inlets 49 of the at least one return feed pump 34, 35, produces a pressure that is higher than a pressure in the associated wheel brake cylinder 13, 14 of the relevant brake circuit I or II. For example due to the selected brake circuit division, which is a so-called diagonal brake circuit division, this results in the possibility that when there are different coefficients of friction on different sides, a rear wheel brake pressure can be set low depending on conditions, while a front wheel brake pressure can be set to a high level. It has already been described that when the third valves 32, 33 are closed, rear wheel brake pressures can be reduced and can also be increased relative to the currently prevailing rear wheel brake pressures. It is therefore clear not only that the antilock device 15 is in a position to reduce cylinder pressures of the wheel brake cylinders and to increase them again at least partially, but also that pressure differences between front brake pressures and rear brake pressures can be produced. The throttles 40 mentioned above are inserted so that in so doing, wheel brake pressure change speeds can be controlled by the control device 16 in a manner that is favorable for the brake behavior. The opening cross sections of these throttles 40 are optimized in a manner that is known per se, for example by means of driving tests. Brake pressure change speeds when reducing pressure can also be varied by adjusting the pump outputs of return feed pumps 34, 35 by means of the drive motor 36. For this purpose, the drive motor 36 is associated with the above-mentioned variable arrow 45 to indicate that the control device 16 can select different drive speeds for the drive motor 36. The lower the speed is that the control device 16 selects, the lower the noise produced by the return feed pumps 34, 35.

Figure 2:
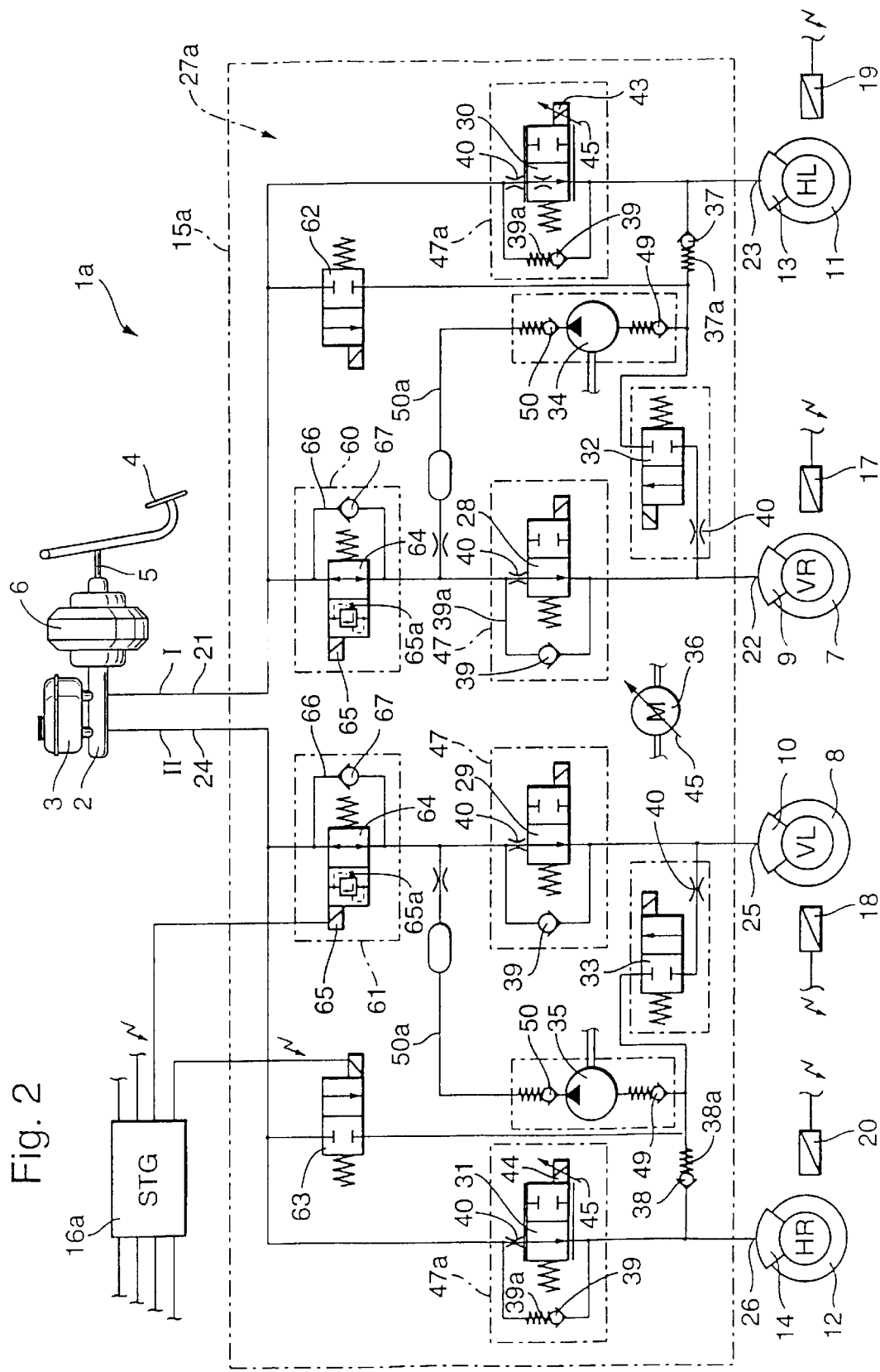
FIG. 2 shows a second circuit of the vehicle brake system, which is modified for drive slip regulation by means of automatic braking of driven vehicle wheels.

The vehicle brake system 1a according to FIG. 2 is a modification of the exemplary embodiment according to FIG. 1, for the purpose that automatic braking becomes possible through the use of front wheel brakes 7 and 8, for example in order to reduce drive slip, when wheels associated with the front wheel brakes 7, 8 are the driving wheels of a vehicle. In this instance, automatic braking is used to compensate for excess driving torque, which is arbitrarily generated by a driver, through compensating brake moments that can be produced by means of the front wheel brakes 7 and 8. An excess of driving torque can also occur, however, when the vehicle travels from a high-traction section of road surface to a lower-traction section of road surface. Left-side or right-side automatic braking can also be adjusted to improve the maneuverability of the vehicle by generating yawing moment whether it is for stabilizing the driving behavior or for supporting the driver in steering maneuvers.

For the reasons mentioned above, the vehicle brake system 1a additionally has fourth valve devices 60, 61 and fifth valves 62, 63. The fifth valves 62 and 63 are distributed to the two brake circuits I and II, are embodied as normally closed 2/2-way valves of the type that can be controlled electromagnetically, and are disposed inside the vehicle brake system 1a and at the same time, inside a valve block 27a between a respective main brake line 21, 24 and a respective inlet valve 49 of the return feed pumps 34, 35. This kind of 2/2-way valves can be selected, for example, from the prior art.

The fourth valve devices 60, 61 are inserted into the vehicle brake system 1a between the main brake lines 21, 24 and first valve devices 28, 29 on the one hand and outlets 50 of the return feed pumps 34, 35 on other hand. The internal design of the fourth valve devices 60, 61 corresponds, for example, to the prior art so that there is a valve 64 inside each of the fourth valve devices 60, 61, which acts as a directional valve in its normal position and acts as a differential pressure regulating valve in its function that can be activated by an electromagnet 65. To this end, the symbol for a differential pressure regulating valve according to DIN ISO 1219 and a differential pressure spring 65a are drawn in the relevant region of the selected symbol. It is clear that as a result of the opening of the fifth valves 62, 63, there are flow center paths from the master cylinder 2 to inlets of the return feed pumps 34, 35 and that with the embodiment of the return feed pumps 34 and 35 as so-called regenerative return feed pumps, they supply themselves with pressure fluid by means of the master cylinder 2 from its reservoir 3. These regenerative return feed pumps 34, 35 feed the above-mentioned pressure fluid in the direction toward the second valves 28, 39 on the one hand and toward the fourth valve devices 60, 61. A switching over of the fourth valve devices 60, 61 by means of the above-mentioned electromagnets 65 produces a pressure difference between the first valves 28, 29 and the main brake lines 21, 24 and consequently for the most part in relation to atmospheric pressure so that upstream of the first valve devices 28, 29, there are pressures that can be supplied fully or partially to the wheel brake cylinders 9, 10 of the front wheel brakes 7, 8. Bypasses 66 are routed around the valves 64 and check valves 67 that can open in the direction of the first valves 28, 29 are inserted into these bypasses. It is clear that when the valves 64 are switched into the differential pressure regulating functions, it is possible to conduct pressure fluid from the master cylinder 2, through the check valves 67, upstream of the first valves 28, 29.

The control device 16a is modified in relation to the control device 16 in FIG. 1 for the detection of excessive drive slip of drive wheels, not shown, which can be braked by means of the front wheel brakes 7, 8. For the detection of disadvantageously increasing drive slip in at least one of the front wheels, the control device 16a evaluates time intervals from successive signals from the wheel rotation sensors 17, 18, 19, 20. If, for example, drive slip increases to a disadvantageous amount in a drive wheel that the wheel brake 7 is associated with, then the control device 16a switches on the drive motor 36, switches the fifth valve 62 into the open position, and switches the fourth valve device 60 into the differential pressure regulating function. As a result of this, the return feed pump 34 withdraws brake fluid from the reservoir 3 by means of the master cylinder 2 and the main brake line 21, and supplies it by means of the pressure line 50a both toward the fourth valve device 60 and toward the first valve 28. The first valve 28 at first remains in the normal position shown so that a brake pressure increase takes place in the wheel brake cylinder 9 and by way of the front wheel brake 7, indirectly compensates for excessive driving torque. If a sufficient excess driving torque compensation has been achieved, then the supply of pressure fluid into the wheel brake cylinder 9 is broken off. This can, for example, be achieved by virtue of the fact that the preceding first valve 28 is switched into the closed position or that the fifth valve 62 is closed so that the return feed pump 34 cannot fill itself and correspondingly, also does not pump or that the fourth valve device 60 is switched into the normal position shown, wherein the first valve 28 is switched into the closed position for the possibly necessary maintenance of a brake pressure in the wheel brake cylinder 9. The above-mentioned closing of the first valve 28 for the purpose of keeping pressure constant in the wheel brake cylinder 9 when the fourth valve device 60 is disposed in the normal position also demonstrates that a brake pressure can be reduced when there is sufficient reduction of drive slip by means of the opening of the first valve 28 and the outflow of pressure fluid from the wheel brake cylinder 9 by means of the first valve 28 and the fourth valve device 60 in the direction of the master cylinder 2. Another possibility for reducing brake pressure in the event of an automatic braking is comprised in that the first valve 28 is switched into the closed position and the second valve 32 is switched into the open position, by means of which pressure fluid travels out of the wheel brake cylinder 9 both to the inlet 49 of the return feed pump 34 and to the fifth valve 62 and can flow away, for example through this fifth valve in the direction of the main brake line 21. Whether this occurs is a function of how great a pressure currently in the wheel brake cylinder 9 is, how high the speed of the drive motor 36 adjusted by the control device 16a is, how great the stroke volume of the return feed pump 34 is, and how narrow the throttle 40 disposed between the wheel brake cylinder 9 and the third valve 32 is designed to be.

As already mentioned, automatic braking can also be carried out for the purpose of improving the maneuverability of the vehicle. If, for example, a curve must be initiated in which the wheel brake 7 is the inner wheel brake of the curve, then a yawing moment can be produced, for example, by means of this wheel brake 7, which makes it easier for the driver to drive into such a curve. Brake pressure delivery into the wheel brake cylinder 9 and brake pressure reduction can be controlled in at least one of the manners described for the drive slip limitation, wherein the control device 16a, however, observes not only wheel rotation signals from the wheel rotation sensors 17, 18, 19, 20, but also observes yawing movements of the vehicle and processes steering angle indications into control procedures or control signals. Since this kind of control signal production belongs to the prior art or can be selected from it, it requires no further functional description here. Therefore merely the indication is given that for the described curve, there is also the possibility of turning the vehicle out of this curve supported by means of automatic braking, through the use of the opposite wheel brake 8. Accordingly, the control device 16a can analogously control at least the fourth valve device 61 and the fifth valve 63.

Since the return feed pumps 34, 35, as a result of their regenerative capability, produce pressure differences in relation to the ambient pressure in the region of their inlets 49, for example springs 37a of the valves 37 that are disposed between the wheel brake cylinders 13, 14 of rear wheel brakes 11, 12 are embodied so that the check valves 37 are so-called pre-stressed check valves and generate pressure differences of 3 bar, for example. Check valves 39 disposed in bypasses to the second valves 30, 31 can also be equipped with springs 39a. These check valves 39 bring about the fact that when the return feed pumps 34, 35 are driven and the fifth valves 62, 63 are open, pressures in the wheel brake cylinders 13 and 14 do not disadvantageously fall below the atmospheric pressure, which would result in an undesirable retraction of brake linings from brake drums or brake disks.

Figure 3:
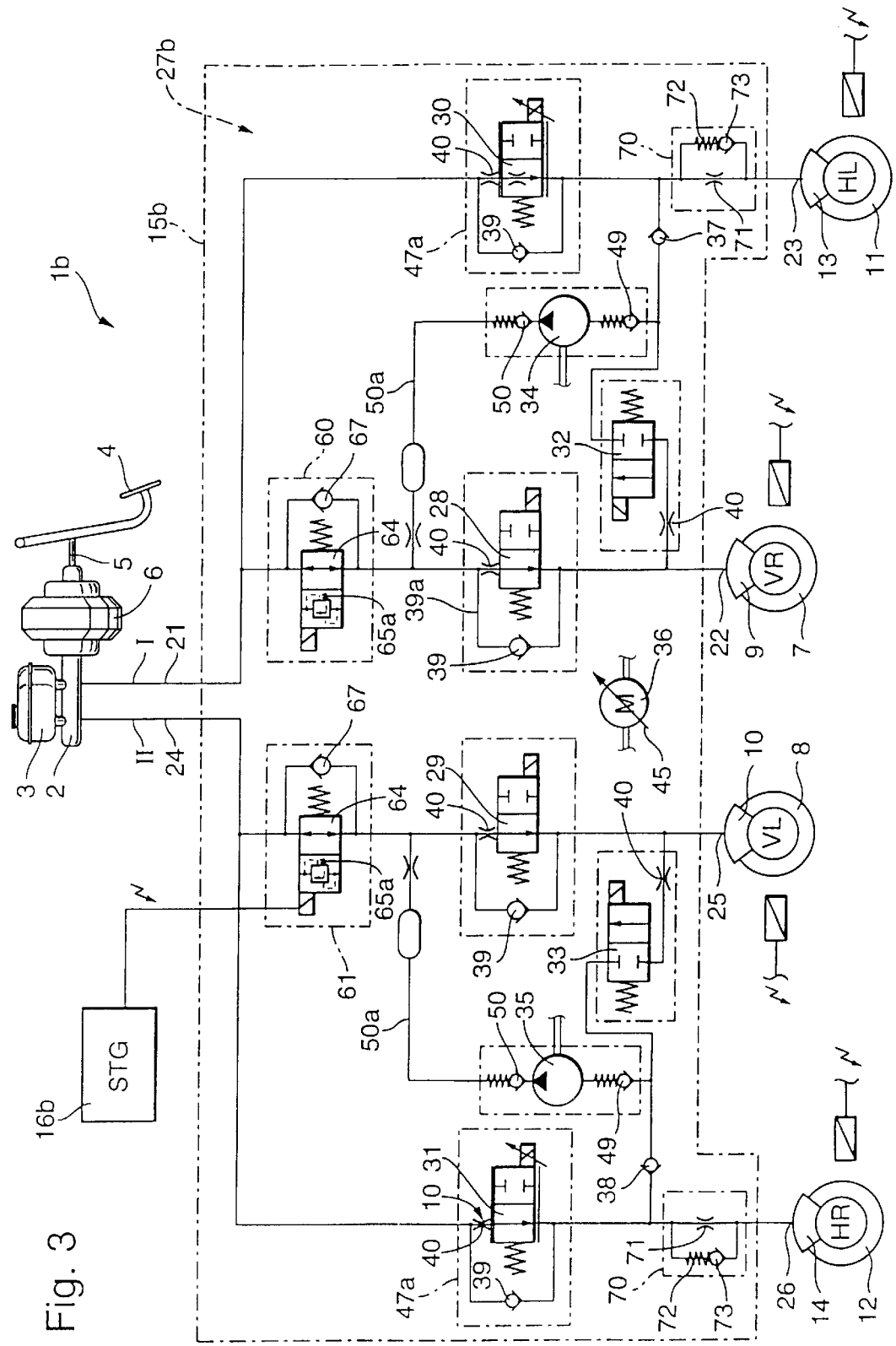
FIG. 3 shows a third circuit of the vehicle brake system, which is likewise modified for drive slip regulation.

With regard to the modification for automatic braking, the exemplary embodiment of a vehicle brake system 1b according to FIG. 3 differs from the exemplary embodiment according to FIG. 2 by virtue of the fact that in addition to first, second, and third valves, only the fourth valve devices 60, 61 are inserted as electromagnetically controllable elements and for the automatic braking operation, the return feed pumps 35, which are in turn embodied as regenerative, supply themselves with pressure fluid from the reservoir 3 by means of open second valves 30, 31. The required pressure fluid then flows from the reservoir 3, through the master cylinder 2, through the respective main brake line 21, 24, through the second valves 30, 31, and through check valves 37 disposed upstream of inlets 49 of the return feed pumps 34, 35, to the return feed pumps 34, 35. However, because the wheel brake cylinders 13 and 14 of the rear wheel brakes 11 and 12 are also connected both to the second valves 30, 31 and to these check valves 37, a throttle check valve 70 is inserted here between these check valves 37 and the wheel brake cylinders 13, 14. Throttles 71 produce a steady, but throttling connection of the second valves 30, 31 to the wheel brake cylinders 13, 14, whereas check valves 73, which are connected in parallel and are loaded with springs 72, are designated to be able to rapidly reduce pressures of the wheel brake cylinders 13, 14 at the end of normal braking operations, for example by means of the sudden release of the brake pedal 5. In a manner comparable to the exemplary embodiment according to FIG. 2, the springs 72 are embodied, for example, in such a way that pressure differences of essentially 1 to for example 3 bar can be generated by means of the check valves 73. Since throttles 40 can in turn be connected in series, for example, with the second valves 30, 31, then check valves 37 without springs or with springs, not shown, that are embodied as weak, are preferable between the second valves 30, 31 and the return feed pumps 34, 35. The use of the exemplary embodiment according to FIG. 3 thus requires open second valves 30, 31 for automatic braking by means of front wheel brakes 7, 8. In contrast to this, the second valves 30, 31 of the vehicle brake system 1a according to FIG. 2 can be closed in automatic braking operation due to the existence of the fifth valves 62, 63 so that the second valves 30, 31, the check valves 39 loaded with springs 39a, and the check valves 37 loaded with springs 37a counteract the danger of a disadvantageous pressure decrease in wheel brake cylinders 13, 14 of the rear wheel brakes 11, 12. Since it is known that there are differently constructed rear wheel brakes, one skilled in the art chooses between the vehicle brake systems 1a and 1b depending on the embodiment type of the rear wheel brakes 13, 14 being used.

The foregoing relates to a preferred exemplary embodiment of the invention, it being understood that other variants and embodiments thereof are possible within the spirit and scope of the invention, the latter being defined by the appended claims.

What is claimed is:

1. A hydraulic brake system of a vehicle, comprising a dual-circuit master cylinder, two brake circuits in a diagonal division for two front wheel brakes and two rear wheel brakes, an antilock device incorporated into the brake circuits, and for each brake circuit, said antilock device has a return feed pump with an inlet valve (49), which is a check valve, and an outlet valve (50), which is a check valve, a first (28, 29) and a second (30, 31) electrically controllable valves, which are normally open, wherein the first valve is disposed between the master cylinder and the respective front wheel brake and wherein the second valve is connected to the respective rear wheel brake, the second valves (30, 31) are disposed between the rear wheel brakes (11, 12) and the master cylinder (2), and that by way of a check valve (37), which is opened in a direction of the inlet valve (49) of the return feed pump (34, 35), the rear wheel brakes (11, 12) are respectively connected to the inlet valves (49) of the return feed pumps (34, 35), and that a third, normally closed valve (32, 33) that is electrically controlled is respectively inserted between the front wheel brakes (7, 8) and the inlet valves (49) of the return feed pumps (34, 35), and said third normally closed valve (32, 33) is installed to control only the return flow from the front wheel brake (7, 8) to the inlet valve (49) of the pump (34, 35).

2. A hydraulic brake system as set forth in claim 1, in which the check valve (37) is disposed in such a manner that only the return flow from the rear wheel brake (11, 12) flows through the check valve (37) to the inlet valve of the pump.

3. A hydraulic brake system of a vehicle, comprising a dual-circuit master cylinder, two brake circuits in a diagonal division for two front wheel brakes and two rear wheel brakes, an antilock device incorporated into the brake circuits, and for each brake circuit, said antilock device has a return feed pump with an inlet and an outlet, a first (28, 29) and a second (30, 31) electrically controllable valves, which are normally open, wherein the first valve is disposed between the master cylinder and the respective front wheel brake and wherein the second valve is connected to the respective rear wheel brake, the second valves (30, 31) are disposed between the rear wheel brakes (11, 12) and the master cylinder (2), and that by way of a check valve (37), which is opened in a direction of the inlet (49) of the return feed pump (34, 35), the rear wheel brakes (11, 12) are respectively connected to the inlets (49) of the return feed pumps (34, 35), and that a third, normally closed valve (32, 33) that is electrically controlled is respectively inserted between the front wheel brakes (7, 8) and the inlets (49) of the return feed pumps (34, 35) to control only the return flow from the front wheel brake (7, 8) to the inlet of the pump (34, 35), and for automatic braking such as drive slip regulation of drive wheels associated with the front wheel brakes (7, 8), a fourth electrically controllable valve device (60, 61) is inserted between the master cylinder (2) and the respective first electrically controllable valve (28, 29) and thereby between the master cylinder (2) and a respective outlet (50) of the respective return feed pump (34, 35), and said fourth valve device is normally open and in automatic braking operation, is at least conditionally closed, and that a fifth valve (62, 63) is inserted between the master cylinder (2), which is combined with a reservoir (3), and the inlet (49) of the respective return feed pump (34, 35).

4. The hydraulic brake system according to claim 3, in which the fifth valve (62, 63) is embodied as a normally closed, electrically controllable 2/2-way valve.

5. The hydraulic brake system according to claim 3, in which the fourth valve device (60, 61) is embodied as a seat valve and has a differential pressure spring (65a).

6. A hydraulic brake system as set forth in claim 3, in which the check valve (37) is disposed in such a manner that only the return flow from the rear wheel brake (11, 12) flows through the check valve (37) to the inlet valve of the pump.

7. The hydraulic brake system according to claim 4, in which springs (39a) are inserted in a pre-stressed manner into check valves (39) that are connected in parallel with the second valves (30, 31).

8. The hydraulic brake system according to claim 7, in which the fourth valve device (60, 61) is embodied as a seat valve and has a differential pressure spring (65a).

9. The hydraulic brake system according to claim 7, in which the fourth valve device (60, 61) is embodied as a seat valve and has a differential pressure spring (65a).

10. A hydraulic brake system of a vehicle, comprising a dual-circuit master cylinder, two brake circuits in a diagonal division for two front wheel brakes and two rear wheel brakes, an antilock device incorporated into the brake circuits, and for each brake circuit, said antilock device has a return feed pump with an inlet and an outlet, a first (28, 29) and a second (30, 31) electrically controllable valves, which are normally open, wherein the first valve is disposed between the master cylinder and the respective front wheel brake and wherein the second valve is connected to the respective rear wheel brake, the second valves (30, 31) are disposed between the rear wheel brakes (11, 12) and the master cylinder (2), and that by way of a check valve (37), which is opened in a direction of the inlet (49) of the return feed pump (34, 35), the rear wheel brakes (11, 12) are respectively connected to the inlets (49) of the return feed pumps (34, 35), and that a third, normally closed valve (32, 33) that is electrically controlled is respectively inserted between the front wheel brakes (7, 8) and the inlets (49) of the return feed pumps (34, 35), and for automatic braking, such as drive slip regulation of drive wheels associated with the front wheel brakes (7, 8), a fourth electrically controllable valve device (60, 61) is inserted between the master cylinder (2) and the respective first electrically controllable valve (28, 29) and an outlet (50) of the respective return feed pump (34, 35), and said fourth valve device is normally open and in automatic braking operation, such as drive slip regulating operation, is at least conditionally closed, and that a throttle check valve device (70, 71, 72, 73) is respectively provided between the respective rear wheel brake (11, 12) and a line node, which is disposed between the second valve (30, 31) and the check valve (37) that is opened in the direction of the inlet (49) of the return feed pump (34, 35), wherein the check valve (73) has a pre-stressed spring (72) and is opened in the direction of the second valve (30, 31).

11. The hydraulic brake system according to claim 10, in which the fourth valve device (60, 61) is embodied as a seat valve and has a differential pressure spring (65a).

* * * * *